US012273936B1

(12) United States Patent
Gronstad et al.

(10) Patent No.: US 12,273,936 B1
(45) Date of Patent: Apr. 8, 2025

(54) SYSTEM FOR CONTROLLING CONNECTION OF A DEVICE TO A NON-TERRESTRIAL NETWORK

(71) Applicant: T-Mobile USA, Inc., Bellevue, WA (US)

(72) Inventors: Egil Gronstad, Bellevue, WA (US); John Joseph Humbert, IV, Olathe, KS (US); Karri M. Kuoppamaki, Kirkland, WA (US); Jun Liu, Sammamish, WA (US); Kun Lu, Bellevue, WA (US); Scott Francis Migaldi, Cary, IL (US); Brian A. Olsen, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/654,834

(22) Filed: May 3, 2024

(51) Int. Cl.
*H04W 76/10* (2018.01)
*H04B 7/185* (2006.01)
*H04W 64/00* (2009.01)

(52) U.S. Cl.
CPC ........ *H04W 76/10* (2018.02); *H04B 7/18513* (2013.01); *H04W 64/00* (2013.01)

(58) Field of Classification Search
CPC ... H04W 76/10; H04W 64/00; H04B 7/18513
See application file for complete search history.

(56) References Cited

U.S. PATENT DOCUMENTS

| 5,303,286 | A  | 4/1994 | Wiedeman |
| 5,327,572 | A  | 7/1994 | Freeburg |
| 5,896,558 | A  | 4/1999 | Wiedeman |
| 6,067,442 | A  | 5/2000 | Wiedeman et al. |
| 6,208,834 | B1 | 3/2001 | Tawil et al. |
| 6,714,760 | B2 | 3/2004 | Robinett |
| 6,856,787 | B2 | 2/2005 | Karabinis |
| 6,879,829 | B2 | 4/2005 | Dutta et al. |
| 6,999,720 | B2 | 2/2006 | Karabinis |

(Continued)

FOREIGN PATENT DOCUMENTS

| CN | 104683013 A | 6/2015 |
| CN | 204707124 U | 10/2015 |

(Continued)

*Primary Examiner* — Muthuswamy G Manoharan
(74) *Attorney, Agent, or Firm* — Perkins Coie LLP

(57) ABSTRACT

The system receives orbital information for at least one satellite of a non-terrestrial network. The orbital information includes the location and velocity of the at least one satellite. The system determines a location of a wireless device and the wireless device's location relative to the at least one satellite. The system calculates a connectivity window based on the relative location. The connectivity window is a time period at the location of the wireless device during which the wireless device receives a signal from the at least one satellite to perform a network connection with the non-terrestrial network. The system connects the wireless device to the non-terrestrial network when the connectivity window of the at least one satellite is open. The system prevents the wireless device from searching for a network connection to the non-terrestrial network when the wireless device is outside the connectivity window of the at least one satellite.

18 Claims, 7 Drawing Sheets

(56) References Cited

U.S. PATENT DOCUMENTS

| | | |
|---|---|---|
| 7,031,702 B2 | 4/2006 | Karabinis et al. |
| 7,039,400 B2 | 5/2006 | Karabinis et al. |
| 7,062,267 B2 | 6/2006 | Karabinis |
| 7,065,321 B2 | 6/2006 | Lim |
| 7,218,931 B2 | 5/2007 | Karabinis |
| 7,447,501 B2 | 11/2008 | Karabinis |
| 7,486,927 B2 | 2/2009 | Kallio et al. |
| 7,593,724 B2 | 9/2009 | Karabinis |
| 7,603,081 B2 | 10/2009 | Karabinis |
| 7,603,117 B2 | 10/2009 | Karabinis |
| 7,664,460 B2 | 2/2010 | Karabinis et al. |
| 7,792,069 B2 | 9/2010 | Karabinis |
| 8,160,610 B2 | 4/2012 | Harper et al. |
| 8,199,051 B2 | 6/2012 | Anderson et al. |
| 8,620,306 B2 | 12/2013 | Pon et al. |
| 9,991,949 B2 | 6/2018 | Darby |
| 11,770,182 B2 | 9/2023 | Khan et al. |
| 2004/0192197 A1 | 9/2004 | Capots et al. |
| 2005/0153732 A1 | 7/2005 | Stotelmyer et al. |
| 2007/0186251 A1 | 8/2007 | Horowitz et al. |
| 2008/0261512 A1 | 10/2008 | Milbrandt et al. |
| 2011/0136428 A1 | 6/2011 | Ritter |
| 2021/0092781 A1* | 3/2021 | Lauridsen ............ H04W 24/02 |
| 2021/0336692 A1 | 10/2021 | Choi |
| 2022/0109496 A1 | 4/2022 | Shrestha et al. |
| 2022/0200693 A1 | 6/2022 | Karlsson et al. |
| 2022/0322263 A1 | 10/2022 | Sengupta et al. |
| 2023/0060101 A1* | 2/2023 | Liberg ................ H04B 17/318 |
| 2023/0109635 A1 | 4/2023 | Palermo et al. |
| 2023/0396330 A1 | 12/2023 | Åström et al. |
| 2024/0053484 A1 | 2/2024 | Sengupta et al. |
| 2024/0179591 A1* | 5/2024 | Ji ........................ H04W 36/08 |

FOREIGN PATENT DOCUMENTS

| | | |
|---|---|---|
| CN | 103026640 B | 11/2016 |
| CN | 104104427 B | 3/2018 |
| CN | 110290493 A | 9/2019 |
| CN | 212229807 U | 12/2020 |
| CN | 114978387 B | 9/2023 |
| JP | 6351535 B2 | 6/2018 |
| KR | 19980073830 A | 11/1998 |
| KR | 200270408 Y1 | 4/2002 |
| KR | 100412972 B1 | 12/2003 |
| KR | 100860050 B1 | 9/2008 |
| KR | 100912112 B1 | 8/2009 |
| KR | 101079963 B1 | 11/2011 |
| KR | 20140059526 A | 5/2014 |
| KR | 20150032148 A | 3/2015 |
| WO | 9901957 A1 | 1/1999 |
| WO | 2007109838 A1 | 10/2007 |
| WO | 2021001532 A1 | 1/2021 |
| WO | 2021221736 A2 | 11/2021 |

\* cited by examiner

SYSTEM FOR CONTROLLING CONNECTION OF A DEVICE TO A NON-TERRESTRIAL NETWORK

BACKGROUND

A mobile phone signal (also known as reception and service) is the signal strength (measured in dBm) received by a mobile phone from a cellular network (on the downlink). Depending on various factors, such as proximity to a tower, any obstructions such as buildings or trees, etc., this signal strength will vary. Most mobile devices use a set of bars of increasing height to display the approximate strength of this received signal to the mobile phone user. Traditionally five bars are used. Areas where mobile phones cannot transmit to a nearby mobile site, base station, or repeater are known as dead zones. In these areas, the mobile phone is said to be in a state of outage. Dead zones are usually areas where mobile phone service is not available because the signal between the handset and mobile site antennas is blocked or severely reduced, usually by hilly terrain, dense foliage, or physical distance.

BRIEF DESCRIPTION OF THE DRAWINGS

Detailed descriptions of implementations of the present invention will be described and explained through the use of the accompanying drawings.

Figure 1:
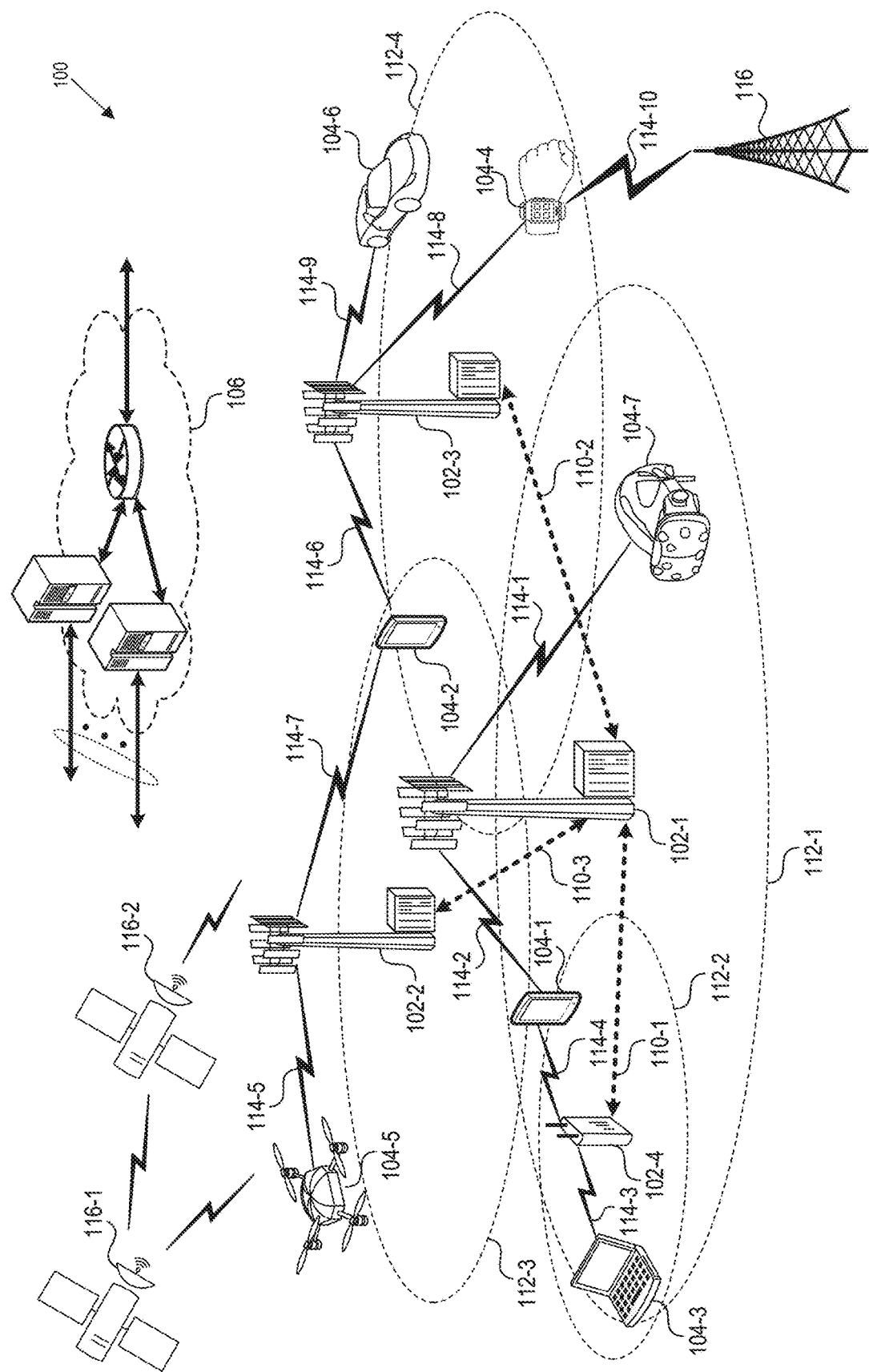
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system for controlling the wireless connection of a wireless device to a non-terrestrial network. A non-terrestrial network is constructed of satellites positioned in Earth's orbit. The distance above the Earth's surface where the satellite is positioned is a factor that determines the number of satellites required to provide global network coverage. For example, a non-terrestrial network would require approximately twelve hundred satellites when the satellites are positioned in orbit five hundred fifty kilometers above the Earth's surface. Additionally, even more satellites may be needed due to the wireless device's limited antenna gain and size. Because a satellite is not continuously over the same geographic region or area of the Earth due to the satellite's orbit, near-global coverage is required to provide continuous network access for any given geographic area. Therefore, until global coverage is achieved, a wireless device will experience interruptions in network coverage and encounter dead zones when a satellite is not positioned over the geographic region containing the wireless device.

Satellites can be interconnected satellites or nonconnected satellites. For example, an interconnected satellite is a satellite that is capable of communicating directly with another satellite in the non-terrestrial network. An interconnected satellite can also directly communicate with a ground station of a terrestrial network or a wireless device. A nonconnected satellite is a satellite that is incapable of directly communicating with another satellite in the non-terrestrial network. A nonconnected satellite is capable of communicating with a ground station or a wireless device. For the nonconnected satellite to communicate with another satellite, a ground station acts as an intermediary, where the nonconnected satellite transmits data to the ground station, and the ground station transmits the data to another satellite. For example, a non-terrestrial network can have only interconnected satellites, only nonconnected satellites, or a combination of both interconnected and nonconnected satellites.

The system can prevent the wireless device from continuously searching for a network connection to the non-terrestrial network when the wireless device is not in the range of a satellite. The system can cause the wireless device to search for a network connection when the wireless device is in the range of a satellite. By not continuously searching for a network connection when one does not exist, the system causes the wireless device to conserve battery life and save energy. Conserving energy reduces greenhouse gas emissions by reducing the frequency at which the wireless device needs to be charged, thus reducing an amount of energy wasted by the wireless device.

To control the wireless device's connection to the non-terrestrial network, the system receives a location for a satellite in orbit. The system determines the location of the wireless device. For example, the system can use a global positioning system (GPS) to determine the wireless device's location. The location of the wireless device can include the longitude and latitude of the wireless device. The system determines the relative location of the wireless device compared to the satellite. Determining the relative location of the satellite to the wireless device allows the system to calculate a connectivity window. The connectivity window is the time period that the wireless device receives a network connection to the non-terrestrial network when at the wireless device's current location. For example, the connectivity window can change based on a change in the latitude of the wireless device or the satellite's orbit.

The number of satellites in the non-terrestrial network determines the length of the gaps between connectivity windows. In one embodiment, a single satellite provides a connection to the non-terrestrial network. The gap between connectivity windows is a time period from when the singular satellite leaves the geographic region containing the wireless device to when the singular satellite returns to the geographic region containing the wireless device. In another embodiment, the non-terrestrial network contains multiple satellites. The multiple satellites can be grouped to reduce or eliminate the gap between the connectivity windows of neighboring satellites. When connectivity is lost from the last satellite in the group, network connectivity is not regained until the orbit of the first satellite in the group again passes over the geographic region containing the wireless device. Grouping the satellites can cause a longer total continuous connectivity window but result in an extended gap from the close of the last satellite's connectivity window to when the connectivity window of the first satellite opens. In yet another embodiment, the non-terrestrial network includes multiple ungrouped satellites. Ungrouped satellites can cause multiple gaps between connectivity windows while preventing a singular extended gap in connectivity caused by having a single grouping of satellites.

The system can search for a connectivity signal and connect the wireless device to the non-terrestrial network when the wireless device is in the connectivity window of a satellite. The system can disconnect the wireless device from the non-terrestrial network when the wireless device is no longer in the connectivity window of a satellite. For example, when the system disconnects the wireless device from the non-terrestrial network, the system can prevent the wireless device from searching for a connectivity signal and attempting to connect to the non-terrestrial network. Searching for a connectivity signal can consume large amounts of power and drain the wireless device's power source or battery. Only searching for a signal during a connectivity window extends the battery life of the wireless device and allows the wireless device to function for a longer time on a single battery charge. Because the wireless device does not have to be charged as often, greenhouse gases are reduced due to the wireless device drawing less energy from the power grid.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
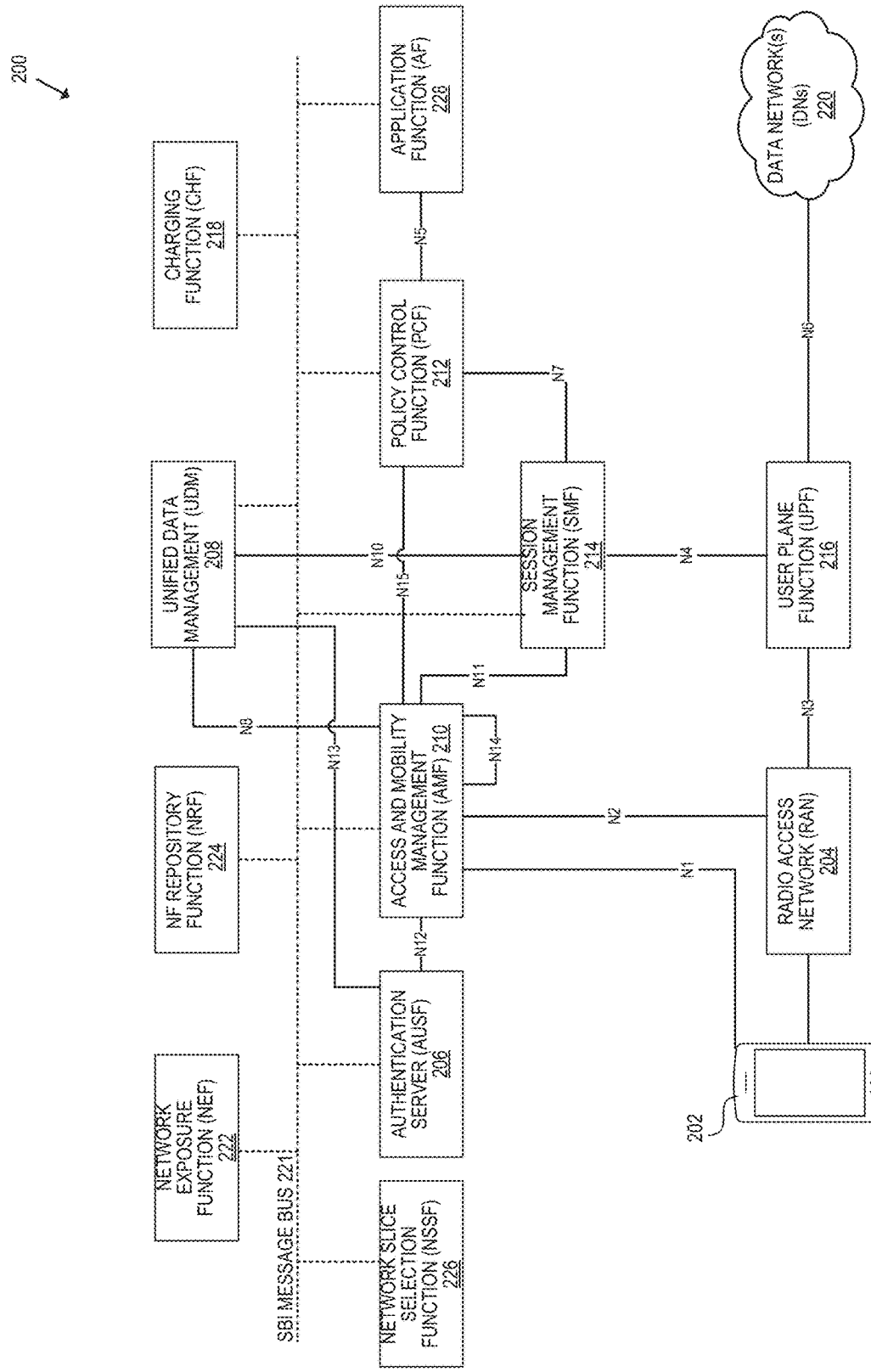
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

System for Controlling a Device's Connection

Figure 3:
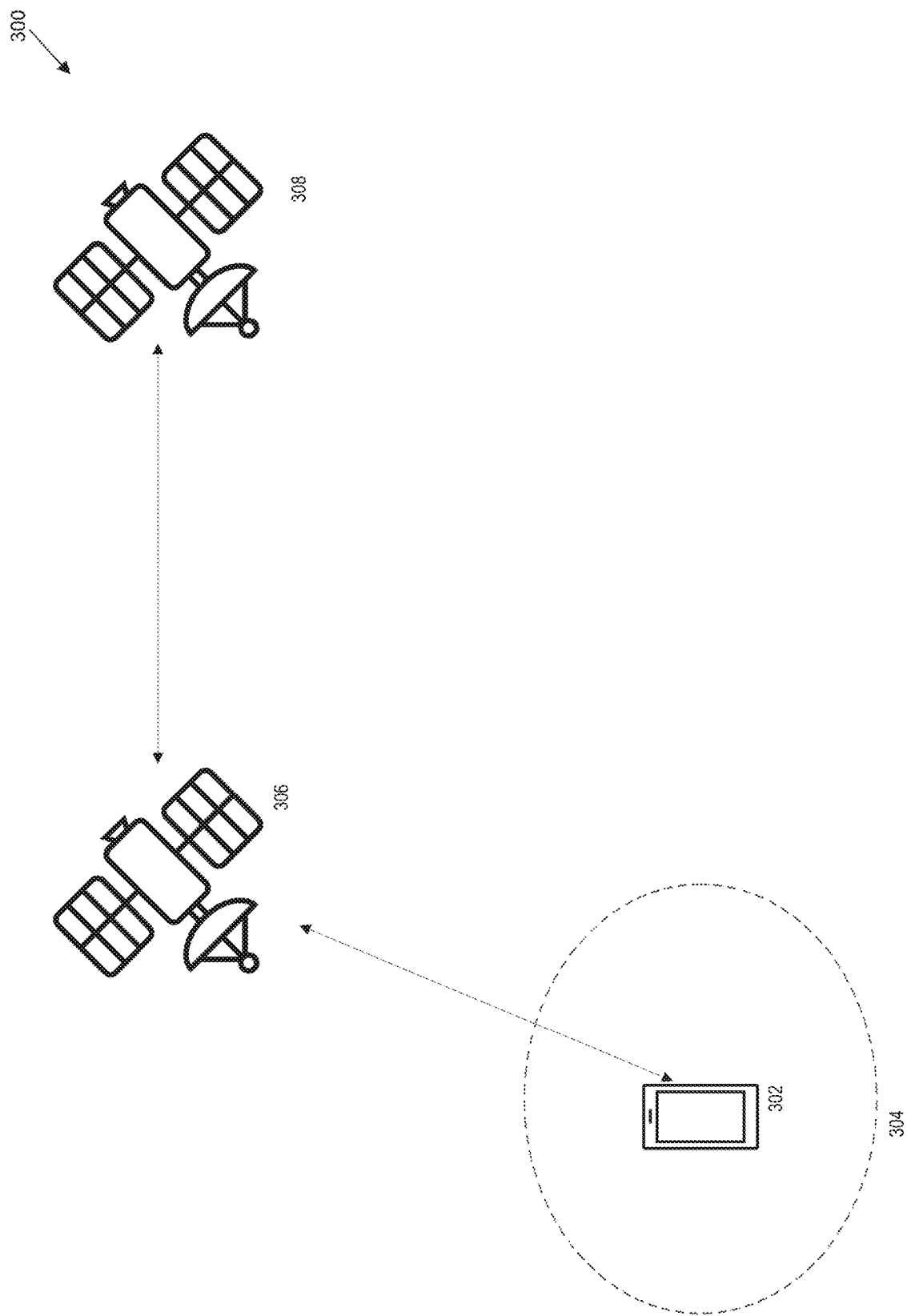
FIG. 3 is a block diagram that illustrates an embodiment of the system when there are multiple interconnected satellites in the non-terrestrial network.

FIG. 3 is a block diagram that illustrates an embodiment 300 of the system when there are multiple interconnected satellites in the non-terrestrial network. Wireless device 302 can be located in a given geographic area. Satellite 306 has a connectivity window 304. Wireless device 302 is located in the connectivity window 304, which means that wireless device 302 is connected to the non-terrestrial network through satellite 306. Because satellite 306 is in orbit and thus constantly moving, satellite 306 cannot indefinitely provide a connection to the non-terrestrial network to wireless device 302 at the current geographic location of wireless device 302.

The system causes satellite 308 to transmit its location to satellite 306. Both satellites have the same orbit. Satellite 308 is a neighboring satellite to satellite 306, meaning satellite 308 is the next satellite in orbit after satellite 306. When satellite 306 receives the location of satellite 308, satellite 306 transmits the location to wireless device 302. Wireless device 302 can calculate the connectivity window for satellite 308. Because wireless device 302 is already connected to satellite 306, the connectivity window 304 for satellite 306 has been calculated. Knowing the connectivity window 304 and the connectivity window for satellite 308 allows wireless device 302 to determine when the geographic location of wireless device 302 will be in the range of a satellite and be able to connect to the non-terrestrial network. The system can disconnect wireless device 302 from the non-terrestrial network when connectivity window 304 closes. To conserve battery life for wireless device 302, the system can prevent wireless device 302 from attempting to connect to the non-terrestrial network when wireless device 302 is not in a connectivity window. Constantly searching for a signal or connection can drain the battery of wireless device 302 to the point where wireless device 302 does not have enough power to connect to the non-terrestrial network when the next connectivity window opens. The system can reconnect the wireless device to the non-terrestrial network when the connectivity window of satellite 308 opens.

Figure 4:
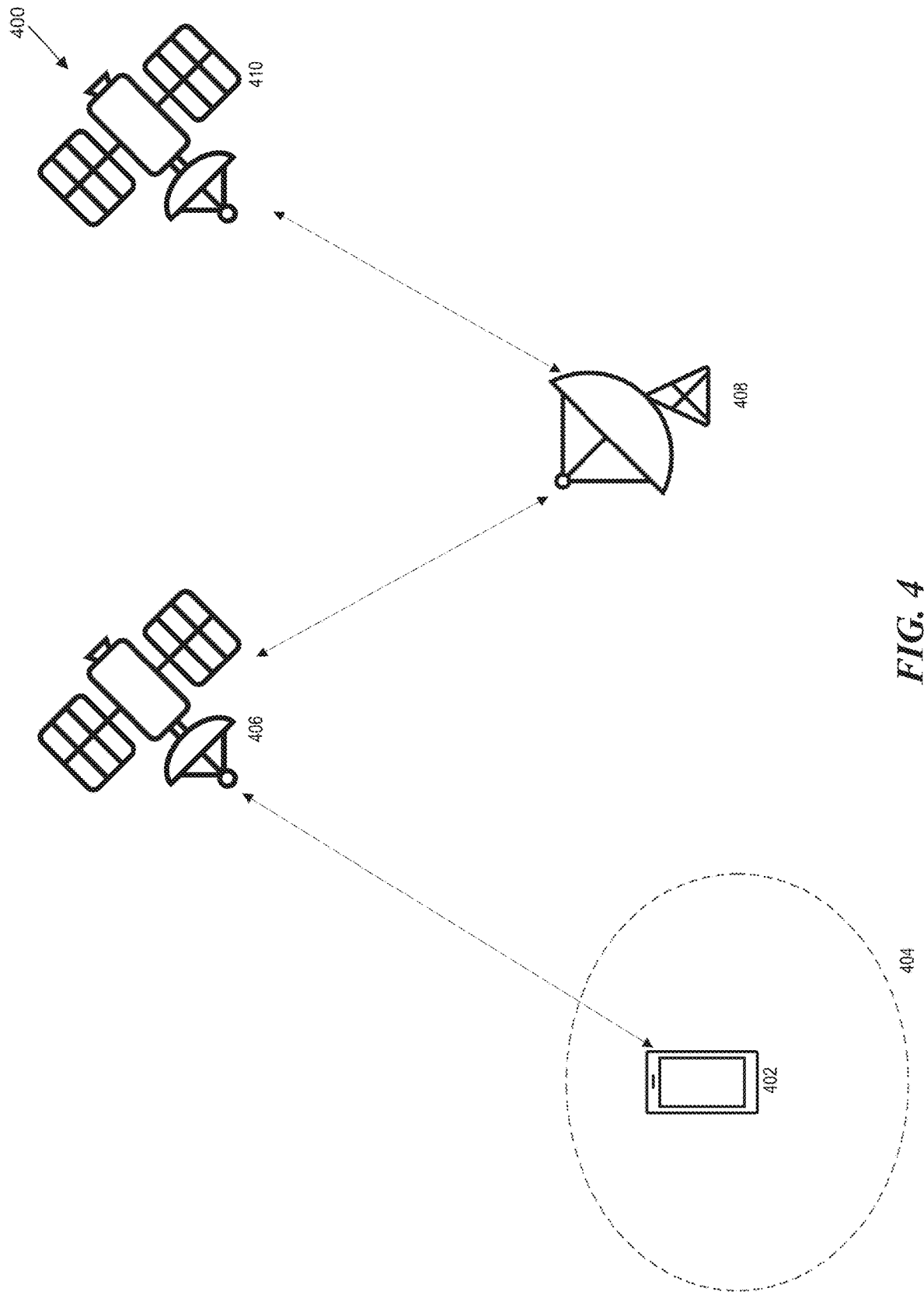
FIG. 4 is a block diagram that illustrates embodiment of the system when there are multiple non-connected satellites in the non-terrestrial network.

FIG. 4 is a block diagram that illustrates embodiment 400 of the system when multiple non-connected satellites are in the non-terrestrial network. Wireless device 402 can be located in a given geographic area. Satellite 406 has a connectivity window 404. Wireless device 402 is located in the connectivity window 404, meaning that wireless device 402 is connected to the non-terrestrial network through satellite 406. Because satellite 406 is in orbit and thus constantly moving, satellite 406 cannot indefinitely provide a connection to the non-terrestrial network to wireless device 402.

Satellite 406 can communicatively couple to the wireless device in addition to ground station 408, but because satellite 406 is a non-connected satellite it cannot connect to other satellites like satellite 410. The system can cause ground station 408 to determine the location of satellite 410 when satellite 406 connects to wireless device 402. Satellite 410 is communicatively coupled to ground station 408. Satellite 406 and satellite 410 have the same orbit. Satellite 410 is a neighboring satellite to satellite 406, meaning satellite 410 is the next satellite in orbit after satellite 406. The system causes ground station 408 to transmit the location of satellite 410 to satellite 406. Satellite 406 transmits the location of satellite 410, where the location is received by wireless device 402. Wireless device 402 calculates a connectivity window for satellite 410. Knowing the connectivity window for satellite 406 and satellite 410 allows the system to determine the gap, if any, between the two connectivity windows where wireless device 402 will be out of the range of any satellite and be unable to connect to the non-terrestrial network. The system causes wireless device 402 to disconnect from the non-terrestrial network when the connectivity window 404 closes. The system then causes wireless device 402 to reconnect to the non-terrestrial network when the connectivity window of satellite 410 is open. The system can prevent the wireless device from attempting to connect to the non-terrestrial network when wireless device 402 is not in a connectivity window.

Figure 5:
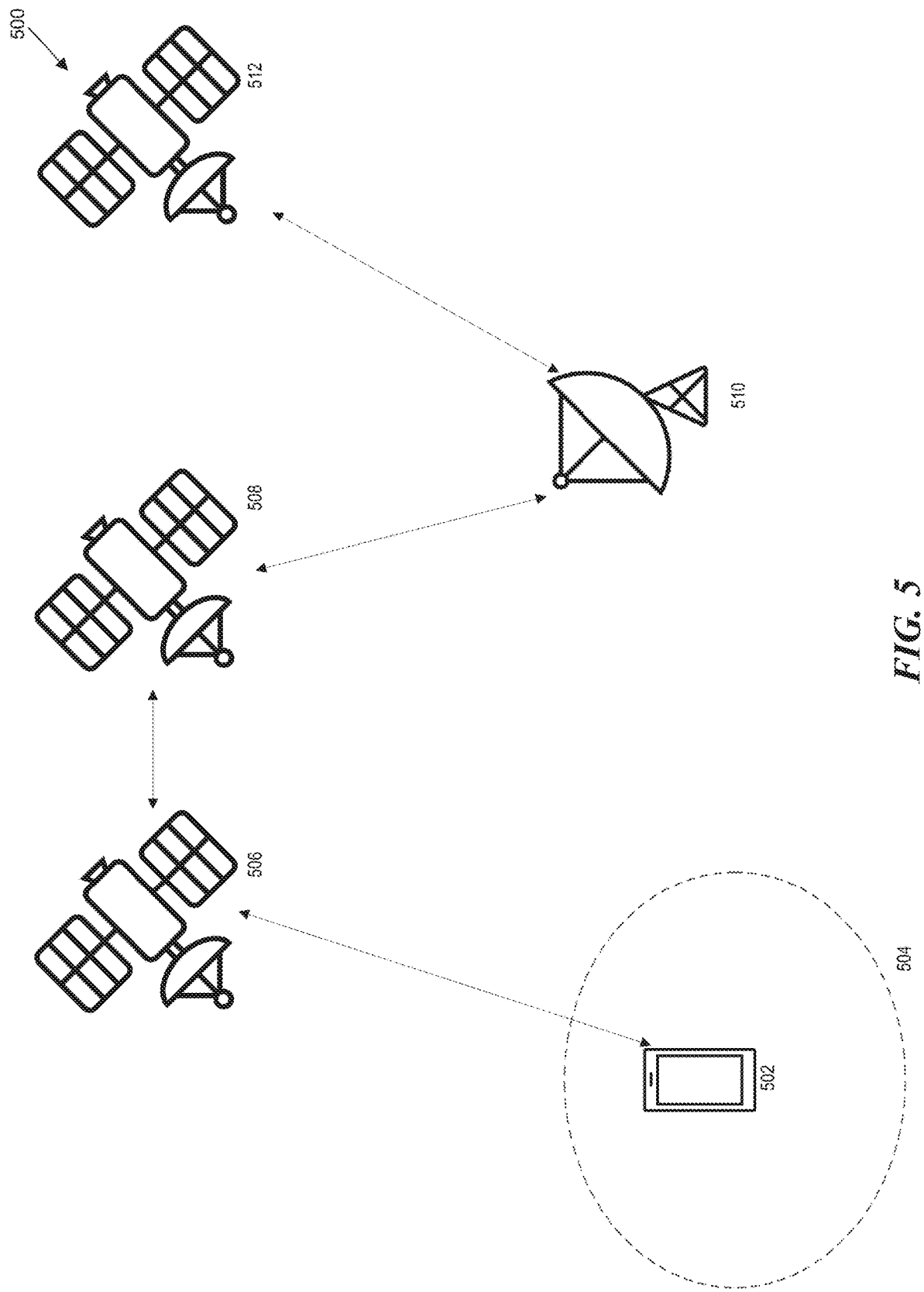
FIG. 5 is a block diagram that illustrates embodiment of the system when there are non-connected satellites and interconnected satellites in the non-terrestrial network.

FIG. 5 is a block diagram that illustrates embodiment 500 of the system when there are non-connected satellites and interconnected satellites in the non-terrestrial network. Wireless device 502 can be located in a given geographic area. Satellite 506 has a connectivity window 504. Wireless device 502 is located in the connectivity window 504, meaning that wireless device 502 is connected to the non-terrestrial network through satellite 506. Because satellite 506 is in orbit and thus constantly moving, satellite 506 cannot indefinitely provide a connection to the non-terrestrial network to wireless device 502.

Satellite 506 and satellite 508 are interconnected satellites, meaning the two satellites are communicatively coupled to each other. Satellite 506 is out of range of ground station 510, which means satellite 506 cannot connect to ground station 510 and is only capable of communicatively coupling to wireless device 502 and satellite 508. Satellite 506 and satellite 508 have the same orbit. Satellite 508 is a neighboring satellite to satellite 506, meaning satellite 508 is the next satellite in orbit after satellite 506. Satellite 512 is a nonconnected satellite, meaning it cannot communicate with other satellites and instead can only communicate through a ground station like ground station 510. Satellite 512 has the same orbit as satellite 506 and satellite 508. Satellite 512 is a neighboring satellite to satellite 508. Therefore, because the geographic region of wireless device 502 places a satellite outside the connectivity range of ground station 510 and satellite 512 is a non-connected satellite, the location of satellite 512 needs to be transmitted to wireless device 502 before satellite 508 is out of the range of ground station 510.

The system causes ground station 510 to determine the location of satellite 512 when satellite 506 connects to wireless device 502. The system causes ground station 510 to transmit the location of satellite 512 to satellite 508. The system causes satellite 508 to transmit the location of satellite 512 to satellite 506. The location of satellite 512 is received at the wireless device from satellite 506. The system causes wireless device 502 to calculate a connectivity window for satellite 512 when wireless device 502 connects to satellite 508 as the connectivity window for satellite 508 opens.

Figure 6:
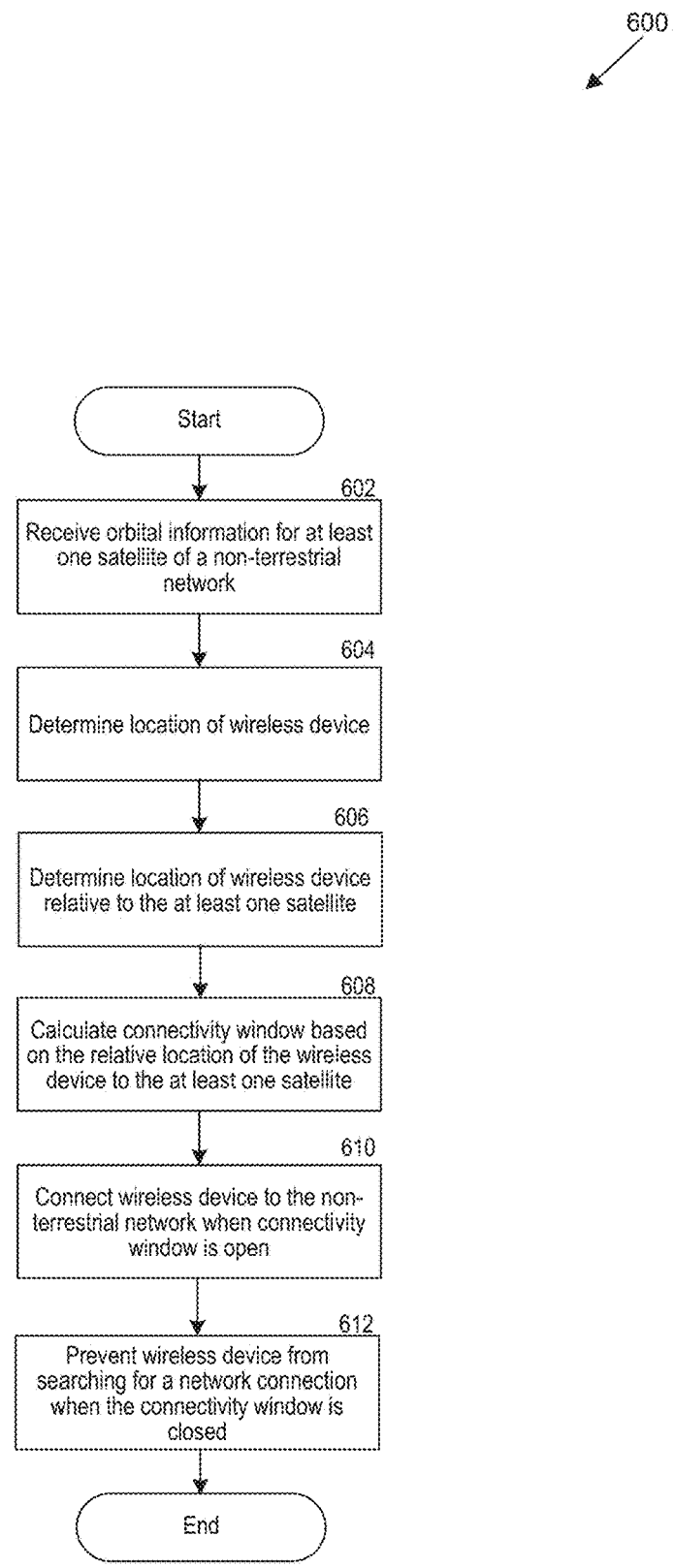
FIG. 6 is a flowchart that illustrates an embodiment of the system.

FIG. 6 is a flowchart that illustrates an embodiment of the system. In one example, the system can be embodied in a computer system, the system including at least one hardware processor and at least one non-transitory memory storing instructions, which, when executed by the at least one hardware processor, cause the system to perform the process 600.

At step 602, the system can receive orbital information for at least one satellite of a non-terrestrial network. In one example, the orbital information includes a location of the at least one satellite and the velocity of the at least one satellite. In one example, the wireless device is configured to continuously search for a network connection to the non-terrestrial network until the wireless device connects to the non-terrestrial network for the first time. At step 604, the system can determine a location of a wireless device. In one example, the location includes a longitude and latitude for the wireless device. At step 606, the system can determine the location of the wireless device relative to the at least one satellite.

At step 608, the system can calculate a connectivity window based on the relative location of the wireless device to the at least one satellite. In one example, the connectivity window is a time period at the location of the wireless device during which the wireless device receives a signal from the at least one satellite to perform a network connection with the non-terrestrial network. In one example, the system can determine an update to the location of the wireless device. The location is updated when the latitudinal or longitudinal coordinate of the wireless device changes. The system can determine a second relative location of the wireless device to the at least one satellite. The system can calculate a new connectivity window based on the second relative location. In another example, the system can update the connectivity window based on an addition or subtraction to a total number of satellites in the non-terrestrial network.

At step 610, the system can connect the wireless device to the non-terrestrial network when the connectivity window of the at least one satellite is open. At step 612, the system can prevent the wireless device from searching for a network connection to the non-terrestrial network when the wireless device is outside the connectivity window of the at least one satellite. In one example, greenhouse gas emissions are reduced due to the wireless device consuming less energy by the wireless device only attempting to connect to the non-terrestrial network when the wireless device is in the connectivity window.

In one example, there are multiple interconnected satellites in the non-terrestrial network. The system can connect a first satellite in the non-terrestrial network to the wireless device. The system can cause a second satellite in the non-terrestrial network to transmit the location of the second satellite to the first satellite. The first satellite and the second satellite have the same orbit. The second satellite is a neighboring satellite which is the next satellite in orbit after the first satellite. The system can receive the location of the second satellite from the first satellite. The system can calculate a connectivity window for each of the multiple satellites. The system can disconnect the wireless device from the non-terrestrial network when the connectivity window of the first satellite is closed. The system can reconnect the wireless device to the non-terrestrial network when the connectivity window of the second satellite is open.

In another example, there are multiple nonconnected satellites in the non-terrestrial network, including a first satellite and a second satellite. The system can connect the first satellite in the non-terrestrial network to the wireless device. The first satellite is communicatively coupled to a ground station of a terrestrial network. The system can cause the ground station to determine a location of the second satellite when the first satellite connects to the wireless device. The second satellite is communicatively coupled to the ground station. The first satellite and the second satellite have the same orbit. The second satellite is a neighboring satellite which is the next satellite in orbit after the first satellite. The system can cause the ground station to transmit the location of the second satellite to the first satellite. The system can receive the location of the second satellite from the first satellite. The system can calculate a connectivity window for each of the multiple nonconnected satellites. The system can disconnect the wireless device from the non-terrestrial network when the connectivity window of the first satellite is closed. The system can reconnect the wireless device to the non-terrestrial network when the connectivity window of the second satellite is open.

In another example, there are multiple interconnected satellites and at least one nonconnected satellite in the non-terrestrial network. The system can connect a first interconnected satellite in the non-terrestrial network to the wireless device. The first satellite is out of range to connect to a ground station of a terrestrial network when the first satellite is connected to the wireless device. The system can cause a second interconnected satellite to connect to the first interconnected satellite. The second interconnected satellite is a neighboring satellite to the first interconnected satellite. The second interconnected satellite is communicatively coupled to the ground station. The system can cause the ground station to determine a location of a nonconnected satellite when the first satellite connects to the wireless device. The nonconnected satellite has the same orbit as the multiple interconnected satellites. The nonconnected satellite is a neighboring satellite to the second interconnected satellite. The system can cause the ground station to transmit the location of the nonconnected satellite to the second interconnected satellite. The system can cause the second interconnected satellite to transmit the location of the nonconnected satellite to the first interconnected satellite. The system can receive the location of the nonconnected satellite from the first interconnected satellite. The system can calculate a connectivity window for the nonconnected satellite when the wireless device connects to the second interconnected satellite.

Computer System

Figure 7:
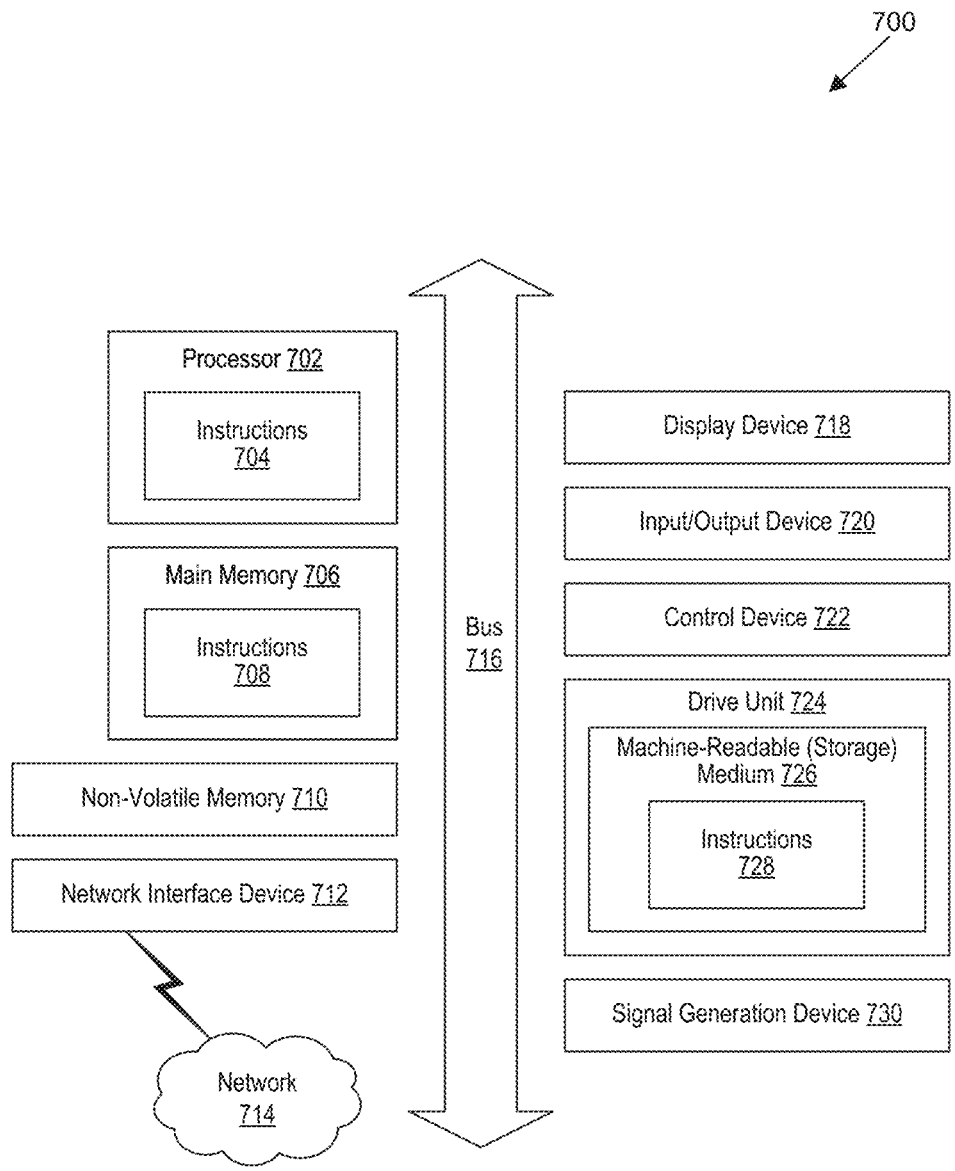
FIG. 7 is a block diagram that illustrates components of a computing device.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:
   at least one hardware processor; and
   at least one non-transitory memory storing instructions, which, when executed by the at least one hardware processor, cause the system to:
   receive orbital information for a first interconnected satellite of a non-terrestrial network,
      wherein the first satellite is out of range to connect to a ground station of a terrestrial network when the first satellite is connected to a wireless device,
      wherein there is at least one other interconnected satellite between the first interconnected satellite and a nonconnected satellite an orbital path of the non-terrestrial network
      wherein the first interconnected satellite is communicatively coupled to at least one other interconnected satellite
      wherein the at least one other interconnected satellite is communicatively coupled to a ground station, and
      wherein the orbital information includes a location of the first interconnected satellite and a velocity of the first interconnected satellite;
   determine a location of the wireless device,
      wherein the location includes a longitude and latitude for the wireless device;
   determine the location of the wireless device relative to the first interconnected satellite;
   calculate a connectivity window based on the relative location of the wireless device to the first interconnected satellite,
      wherein the connectivity window is a time period at the location of the wireless device during which the wireless device receives a signal from a satellite in the non-terrestrial network to perform a network connection with the non-terrestrial network;

connect the wireless device to the non-terrestrial network when the connectivity window of the at least one first interconnected satellite is open; and cause the ground station to determine a location of the nonconnected satellite when the first interconnected satellite connects to the wireless device, and cause the ground station to transmit the location of the nonconnected satellite to the at least one other interconnected satellite;

cause the at least one other interconnected satellite to transmit the location of the nonconnected satellite to the first interconnected satellite;

receive the location of the nonconnected satellite from the first interconnected satellite;

wherein the wireless device calculates a connectivity window for the nonconnected satellite when the wireless device connects to the at least one other interconnected satellite; and prevent the wireless device from searching for a network connection to the non-terrestrial network when the wireless device is outside the connectivity window of a satellite in the non-terrestrial network.

2. The system of claim 1 further caused to:

determine an update to the location of the wireless device, wherein the location is updated when the longitude and latitude coordinate of the wireless device changes;

determine a second relative location of the wireless device to a currently connected satellite to the wireless device; and calculate a new connectivity window based on the second relative location.

3. The system of claim 1, wherein there are multiple interconnected satellites in the non-terrestrial network after the nonconnected satellite, the system further caused to:

connect a third interconnected satellite in the non-terrestrial network to the wireless device;

cause a fourth interconnected satellite in the non-terrestrial network to transmit the location of the fourth interconnected satellite to the first third interconnected satellite, wherein the third interconnected satellite and the fourth interconnected satellite have a same orbit, and wherein the fourth interconnected satellite is a neighboring satellite which is a next satellite in orbit after the third interconnected satellite;

receive the location of the fourth interconnected satellite from the third interconnected satellite;

calculate a connectivity window for each of the multiple satellites;

disconnect the wireless device from the non-terrestrial network when the connectivity window of the third interconnected satellite is closed; and reconnect the wireless device to the non-terrestrial network when the connectivity window of the fourth interconnected satellite is open.

4. The system of claim 1, wherein there are multiple nonconnected satellites in the non-terrestrial network after the nonconnected satellite including a first satellite and a second satellite, the system further caused to:

connect the first satellite in the non-terrestrial network to the wireless device;

wherein the first satellite is communicatively coupled to a ground station of a terrestrial network;

cause the ground station to determine a location of the second satellite when the first satellite connects to the wireless device, wherein the second satellite is communicatively coupled to the ground station, wherein the first satellite and the second satellite have a same orbit, and wherein the second satellite is a neighboring satellite which is a next satellite in orbit after the first satellite;

cause the ground station to transmit the location of the second satellite to the first satellite;

receive the location of the second satellite from the first satellite;

calculate a connectivity window for each of the multiple nonconnected satellites;

disconnect the wireless device from the non-terrestrial network when the connectivity window of the first satellite is closed; and reconnect the wireless device to the non-terrestrial network when the connectivity window of the second satellite is open.

5. The system of claim 1, wherein the wireless device is configured to continuously search for a network connection to the non-terrestrial network until the wireless device connects to the non-terrestrial network for the first time.

6. The system of claim 1, wherein greenhouse gas emissions are reduced due to the wireless device consuming less energy by the wireless device only attempting to connect to the non-terrestrial network when the wireless device is in the connectivity window.

7. The system of claim 1, further caused to:

update the connectivity window based on an addition or subtraction to a total number of satellites in the non-terrestrial network.

8. A non-transitory, computer-readable storage medium comprising instructions recorded thereon, wherein the instructions when executed by at least one data processor of a system, cause the system to:

calculate a connectivity window of at least one satellite of a non-terrestrial network, wherein the at least one satellite is an interconnected satellite; and wherein the connectivity window is a time period at a location of a wireless device during which the wireless device receives a signal from the at least one satellite to perform a network connection with the non-terrestrial network;

connect the wireless device to the non-terrestrial network when the connectivity window of the at least one satellite is open, wherein the at least one satellite is connected to a second interconnected satellite when the wireless device connects to the at least one satellite;

cause a ground station to determine a location of a nonconnected satellite, wherein the ground station is communicatively coupled to the nonconnected satellite and the second interconnected satellite, wherein the ground station transmits the location of the nonconnected satellite to the second interconnected satellite;

receive the location of the nonconnected satellite from the at least one satellite;

wherein the at least one satellite received the location of the nonconnected satellite from the second interconnected satellite;

wherein the wireless device calculates a connectivity window for the nonconnected satellite when the wireless device connects to the second interconnected satellite; and prevent the wireless device from searching for a network connection to the non-terrestrial network when the wireless device is outside the connectivity window of the at least one satellite.

9. The non-transitory storage medium of claim 8, wherein the instructions further cause the system to:
determine an update to the location of the wireless device,
wherein the location is updated when a latitudinal or longitudinal coordinate of the wireless device changes; and
calculate a new connectivity window based on the update to the location of the wireless device.

10. The non-transitory storage medium of claim 8, wherein the instructions further cause the system to:
connect a first satellite in the non-terrestrial network to the wireless device;
cause a second satellite in the non-terrestrial network to transmit the location of the second satellite to the first satellite,
wherein the second satellite is a neighboring satellite which is a next satellite in orbit after the first satellite;
receive the location of the second satellite from the first satellite;
calculate a connectivity window for each of the first and second satellites;
disconnect the wireless device from the non-terrestrial network when the connectivity window of the first satellite is closed; and
reconnect the wireless device to the non-terrestrial network when the connectivity window of the second satellite is open.

11. The non-transitory storage medium of claim 8, wherein there is at least a first nonconnected satellite and a second nonconnected satellite after the nonconnected satellite in the non-terrestrial, wherein the instructions further cause the system to:
connect the first nonconnected satellite in the non-terrestrial network to the wireless device;
cause the ground station to determine a location of the second nonconnected satellite when the first nonconnected satellite connects to the wireless device,
wherein the first nonconnected satellite and the second nonconnected satellite are communicatively coupled to the ground station, and
wherein the second nonconnected satellite is a neighboring satellite which is the next satellite in orbit after the first nonconnected satellite;
cause the ground station to transmit the location of the second nonconnected satellite to the first nonconnected satellite;
receive the location of the second nonconnected satellite from the first nonconnected satellite;
calculate a connectivity window for the first and second nonconnected satellites;
disconnect the wireless device from the non-terrestrial network when the connectivity window of the first nonconnected satellite is closed; and
reconnect the wireless device to the non-terrestrial network when the connectivity window of the second nonconnected satellite is open.

12. The non-transitory storage medium of claim 8, wherein the wireless device is configured to continuously search for a network connection to the non-terrestrial network until the wireless device connects to the non-terrestrial network for the first time.

13. The non-transitory storage medium of claim 8, wherein the instructions further cause the system to:
update the connectivity window based on an addition or subtraction to a total number of satellites in the non-terrestrial network.

14. A method comprising:
receiving orbital information for at least one satellite of a non-terrestrial network;
calculating a connectivity window of the at least one satellite,
wherein the at least one satellite is an interconnected satellite; and
wherein the connectivity window is a time period at a location of a wireless device during which the wireless device receives a signal from the at least one satellite to perform a network connection with the non-terrestrial network;
connecting the wireless device to the non-terrestrial network when the connectivity window of the at least one satellite is open,
wherein the at least one satellite is connected to a second interconnected satellite when the wireless device connects to the at least one satellite;
cause a ground station to determine a location of a nonconnected satellite,
wherein the ground station is communicatively coupled to the nonconnected satellite and the second interconnected satellite,
wherein the ground station transmits the location of the nonconnected satellite to the second interconnected satellite;
receive the location of the nonconnected satellite from the at least one satellite;
wherein the at least one satellite received the location of the nonconnected satellite from the second interconnected satellite;
wherein the wireless device calculates a connectivity window for the nonconnected satellite when the wireless device connects to the second interconnected satellite; and
preventing the wireless device from searching for a network connection to the non-terrestrial network when the connectivity window of the at least one satellite is closed.

15. The method of claim 14 further comprising:
determining an update to the location of the wireless device,
wherein the location is updated when a latitudinal or longitudinal coordinate of the wireless device changes; and
calculating a new connectivity window based on the update to the location of the wireless device.

16. The method of claim 14, wherein there are multiple interconnected satellites after the nonconnected satellite in the non-terrestrial network, further comprising:
connecting a first satellite in the non-terrestrial network to the wireless device;
causing a second satellite in the non-terrestrial network to transmit the location of the second satellite to the first satellite,
wherein the second satellite is a neighboring satellite which is a next satellite in orbit after the first satellite;

receiving the location of the second satellite from the first satellite;

calculating a connectivity window for each of the multiple satellites;

disconnecting the wireless device from the non-terrestrial network when the connectivity window of the first satellite is closed; and reconnecting the wireless device to the non-terrestrial network when the connectivity window of the second satellite is open.

17. The method of claim 14, wherein there is at least a first nonconnected satellite and a second nonconnected satellite after the nonconnected satellite in the non-terrestrial network including a first satellite and a second satellite, further comprising:

connecting the first nonconnected satellite in the non-terrestrial network to the wireless device;

causing the ground station to determine a location of the second nonconnected satellite when the first nonconnected satellite connects to the wireless device, wherein the first nonconnected satellite and the second nonconnected satellite are communicatively coupled to the ground station, wherein the first nonconnected satellite and the second nonconnected satellite have a same orbit, and wherein the second nonconnected satellite is a neighboring satellite which is a next satellite in orbit after the first nonconnected satellite;

causing the ground station to transmit the location of the second nonconnected satellite to the first nonconnected satellite;

receiving the location of the second nonconnected satellite from the first nonconnected satellite;

calculating a connectivity window for the first and second nonconnected satellites;

disconnecting the wireless device from the non-terrestrial network when the connectivity window of the first nonconnected satellite is closed; and reconnecting the wireless device to the non-terrestrial network when the connectivity window of the second nonconnected satellite is open.

18. The method of claim 14 further comprising:

updating the connectivity window based on an addition or subtraction to a total number of satellites in the non-terrestrial network.

* * * * *